Oct. 23, 1951    J. R. OISHEI    2,572,750
WINDSHIELD CLEANER MECHANISM
Filed Aug. 21, 1944    5 Sheets-Sheet 1

INVENTOR
John R. Oishei
BY
Bean, Brooks, Buckley & Bean ATTORNEYS

Oct. 23, 1951          J. R. OISHEI          2,572,750

WINDSHIELD CLEANER MECHANISM

Filed Aug. 21, 1944          5 Sheets—Sheet 3

INVENTOR
John R. Oishei
BY
Bean, Brooks, Buckley & Bean ATTORNEYS

Oct. 23, 1951  J. R. OISHEI  2,572,750
WINDSHIELD CLEANER MECHANISM
Filed Aug. 21, 1944  5 Sheets-Sheet 4

INVENTOR
John R. Oishei
BY
Bean, Brooks, Buckley & Bean, ATTORNEYS

Oct. 23, 1951   J. R. OISHEI   2,572,750
WINDSHIELD CLEANER MECHANISM
Filed Aug. 21, 1944   5 Sheets-Sheet 5

INVENTOR
John R. Oishei
BY
Bean, Brooks, Buckley & Bean ATTORNEYS

UNITED STATES PATENT OFFICE 2,572,750

WINDSHIELD CLEANER MECHANISM

John R. Oishei, Buffalo, N. Y., assignor to Trico Products Corporation, Buffalo, N. Y.

Application August 21, 1944, Serial No. 550,327

20 Claims. (Cl. 15—253)

This invention relates to an automatic windshield cleaner mechanism installation for a motor vehicle.

In present day automotive vehicle construction the rear of the engine compartment is usually defined by a vertical transverse wall commonly called the dash and a cowl extends rearwardly from the upper edge of the dash to a point where conventional windshield structure extends upwardly therefrom. In current practice the dash comprises a fire wall which is substantially insulated to minimize the transmission of heat and sound from the engine compartment to the passenger compartment. Likewise in current practice, the longitudinal or rearward extent of the cowl from the dash or fire wall to the place where the windshield rises therefrom is considerable.

The space beneath such cowl commonly houses a variety of automotive vehicle adjuncts and accessories including automatic windshield cleaner mechanism. Windshields themselves are generally divided into two sections by a central upright mullion, but in any event it is almost universal practice to provide a pair of oscillatory windshield wiper arms and supporting rock shafts, with the latter disposed adjacent the lower edge of the windshield, one for each of the two sections thereof. The rock shafts are generally supported by brackets or other bearing means fixed to the cowl element, such brackets being located outside or forwardly of the windshield proper.

It is usual to employ a single operating motor, generally of the vacuum type and generally disposed centrally of the vehicle in the cowl compartment. This same compartment or space is utilized to house radio receiving sets, heaters, the variety of wiring which extends to and from the instrument panel, cowl vent control linkage and handles, a glove compartment, emergency brake linkage, etc. The result is that this space is somewhat crowded and installation of the various accessories in assembling the vehicle and in servicing is rendered awkward, cumbersome and complicated.

The almost universal commercial practice today is to transmit the oscillation of the rock shaft of the wiper motor to the rock shafts of the wiper arms by means of links or connecting rods which engage cranks on the motor rock shaft and the wiper rock shafts. Such links are generally of peculiarly offset form to clear and extend about various obstructions and in order to possess sufficient compressive stiffness, particularly in view of their offset nature, are necessarily of considerable mass and surface area.

From the standpoint of directness of power transmission the ideal location for the wiper motor in this link type mechanism would be in a direct line between the wiper rock shaft. From the opposing consideration of available space and convenience of mounting, the ideal location of the wiper motor is in a much more forward position preferably adjacent the rear side of the fire wall which defines the front of the cowl compartment. In practice these conflicting considerations compel a compromise between these extremes in locating the wiper motor.

The present invention provides a windshield cleaner arrangement wherein the transmission is so arranged that the wiper motor may be located as far forward as may be desired without complicating transmission and without substantially intersecting the cowl compartment with transmission elements and in a manner which leaves the cowl compartment substantially free of windshield cleaner transmission elements. In fact in a preferred form the windshield wiper motor may be disposed entirely outside of the passenger compartment and in the engine compartment adjacent the front of the dash or fire wall. The actuating motor is thus rendered readily accessible by merely raising the engine compartment hood and all of its incidental sounds of operation are effectively isolated from the passenger compartment.

All of the transmission elements located within the cowl compartment are disposed closely adjacent the under side of the cowl itself and closely adjacent the rear of the dash or fire wall, thus leaving the cowl compartment proper substantially free and uninterrupted by windshield cleaner mechanisms whereby it may more conveniently house other essential or desirable adjuncts and accessories.

Stated generally, the present invention comprises cable transmission wherein the cable drive elements extend laterally from a central point closely adjacent the rear of the dash or fire wall in the cowl compartment, thence rearwardly along the underside of the cowl, thence generally upwardly to the two wiper rock shafts.

The cable drive means for each wiper element comprises a pair of cables extending to each such unit whereby they may be alternately pulled by a crank oscillated by the wiper motor to oscillate a wiper rock shaft. The cables will have sufficient initial tension so that they are under tension at all times and the force transmitted thereby is really the differential of tension as between the pair of cables. While reference is made here to two cables for each wiper unit, the cable means may really be a single piece of cable doubled upon itself, as described later herein. It is found that the drive means here proposed is practically noiseless and further than that the flexible nature of the stranded lightweight metallic cables which are preferred is such that motor and crank noises which might exist are not conducted as audible vibrations to locations where they might be audible to occupants of a vehicle.

In the previously discussed conventional link type transmissions, the considerable masses of the links and the substantial inertia which is imparted to them and must be absorbed in each successive stroke causes a very objectionable repetitious pounding sound, particularly when the least bit of wear develops. In such transmissions the various bearing clearances are reversed in position upon each reversal of movement and this simultaneous take-up further adds to objectionable sound of operation besides increasing normal wear on the parts. The entire cable system of the present invention is under continuous though varying tension so that there is no alternative reversal of stresses with all of its attending undesirabilities.

In the link transmission of the prior practical art the mass and inertia of the links or connecting rods and their associated parts produce undesirable but unavoidable overtravel at the end of each stroke, such overtravel varying at various speeds of operation. In the present system this condition is substantially eliminated due to the insignificant mass and inertia of the principal drive means.

In the presently proposed cable drive system tension is alternately applied to the drive cables by connection with a crank oscillated by the actuating motor. For this reason the speed of movement of the cables accelerates during the first half of a stroke and decelerates during the latter half due to the harmonic component of crank movement imparted to the cables. This provides the greatest force during the ends of each stroke where it is needed most and the greatest wiper speed at the middle of the stroke, likewise an optimum condition, and reduces the abruptness of reversal at the ends of strokes.

Since the tensions in the pairs of cables for the opposite wiper units is directly opposed they normally balance their respective thrust reactions with respect to the motor bearings, rather than acting cumulatively as in the prior art.

Further objects of the invention and advantages resulting from the use thereof will be observed from a detailed consideration of typical embodiments thereof shown in the drawings and described in detail herein. Some of the further objects and advantages will be alluded to more particularly in describing the exemplary embodiments.

Throughout the several figures of the drawings like characters of reference denote like parts. Reference will first be had to the embodiment of the present invention illustrated in Figs. 1 through 8 and in Fig. 1, the dot and dash lines A and B schematically represent the lower edges of a pair of conventionally inclined angularly related windshield sections, their respective windshield wiper rock shaft axes being represented by the dot and dash lines C and D. The vehicle dash, that is, the fire wall separating the engine compartment from the passenger compartment, is designated generally 10 in Fig. 1, and comprises a sheet metal wall 11 at the engine side and a fiber or other non-metallic sheet 12 at the passenger side of the wall with an intermediate layer of heat and sound insulating material 13.

Figure 1:
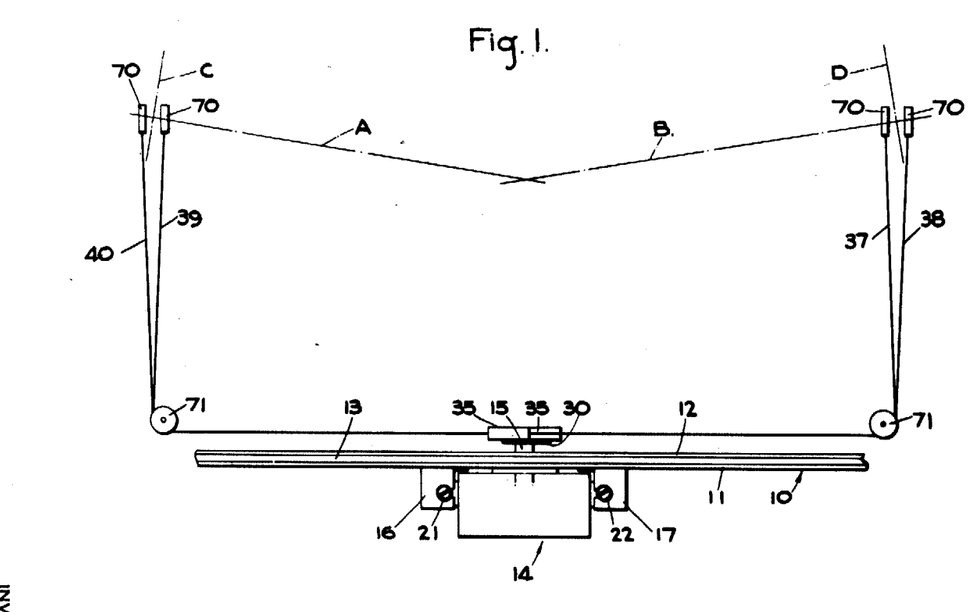
Fig. 1 is a somewhat schematic general top plan view of a preferred arrangement of the windshield cleaning system of my invention.
Figure 3:
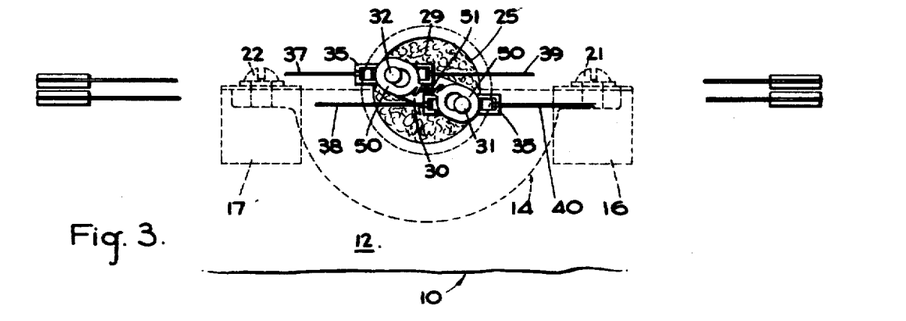
Fig. 3 is an elevational view looking at the dash or fire wall from its rear side and showing the wiper motor and its associated crank pin drive means.
Figure 4:
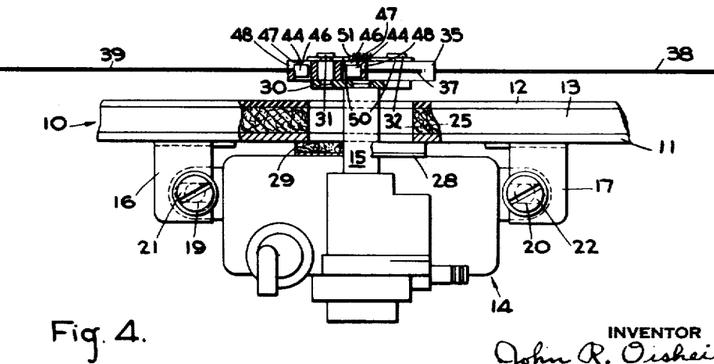
Fig. 4 is a top plan view of the motor and drive means with the dash or fire wall shown in cross section.

The windshield wiper actuating motor is designated generally 14 in Fig. 1 and, as appears better from a consideration of Figs. 3 and 4, is of the well known oscillating vane type having an output rock shaft 15. A pair of angular mounting brackets 16 and 17 may be permanently attached to the metal wall element 11 as by welding or the like and in the form illustrated in Figs. 3 and 4 the brackets have horizontally extending flanges notched as at 19 and 20 respectively to receive mounting screws 21 and 22 associated with the motor 14, whereby the latter may be securely locked in properly adjusted transverse position.

It will be noted that an enlarged fire wall opening 25 through which rock shaft 15 extends is closed in mounting the wiper motor by a fiber washer 28 and a layer of sound and heating insulating material 29. By virtue of this construction all sound incident to normal motor operation, including the snap action of its valves and the hissing of the operating fluid, is effectively isolated from the passenger compartment. It will appear hereinafter that the physical mass of the rigidly connected drive structure within the cowl compartment or passenger compartment is so insignificant as to negative the possibility of "telegraphing" sound from the motor. In conventional link-connected windshield wiper transmissions the links themselves are actually of sufficient expanse to in themselves constitute effective sound emitting diaphragms which actually amplify incidental sounds generated in operation.

At its inner or passenger compartment end motor rock shaft 15 has fixed thereto, as by riveting or the like, a drive or crank member 30 which carries a pair of oppositely and eccentrically disposed crank pins 31 and 32. Each of the crank pins 31 and 32 pivotally supports a block 35 and the blocks afford anchoring means for flexible drive cables extending from the operating motor to the pair of windshield wiper units. In Fig. 3 the numerals 37 and 38 designate the opposite ends of a unitary drive cable for the lefthand windshield wiper unit and the numerals 39 and 40 designate the opposite ends of a single unitary flexible drive cable for the righthand windshield wiper unit.

The ends of the cables are provided with integral cylindrical enlargements or heads 44 for conveniently associating the cable ends with pivot blocks 35. For engaging the cable ends each pivot block 35 has a pair of lateral openings 46, one at each side of the central pivot pin bearing opening and each having an overhanging ledge 47 at its outer side. Slots 48 extend partially through the ends of the blocks to receive the cables proper. In assembling the cables with blocks 35 the cylindrical enlargements 44 are introduced into openings 46 from the upper side as viewed in Fig. 4 until their cables seat in the bottom of slot 48 whereupon the cylindrical enlargements engage under ledges 47 and since the cables are continuously under tension their accidental dislodgement is effectively prevented.

To retain the blocks 35 on their respective crank pins 31 and 32, the latter are provided with projecting necked portions and a pair of stirrup members 50 are connected by an extension spring 51. The stirrup members have keyhole openings for assembly about the crank pins 31 and 32 by extension of the spring 51, the latter causing the stirrups 50 to set in the grooves of the crank pin projections and thus retain assembly of blocks 35 on the pivot pins.

Figure 2:
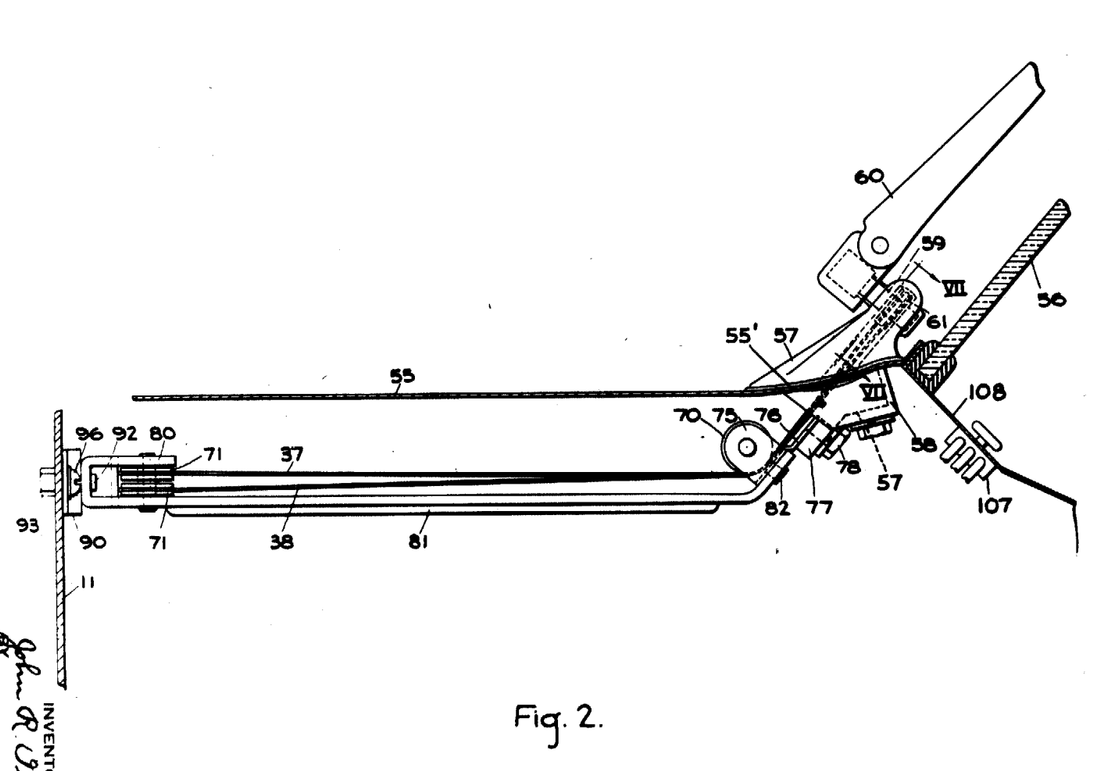
Fig. 2 is a longitudinal cross sectional view through the cowl portion of a motor vehicle showing a portion of the windshield cleaning system of Fig. 1 in side elevation.

To facilitate a discussion of the novel mode of assembling the mechanism, which includes a novel, simple and highly effective mode of tensioning the cables, the intermediate pulley means will be described later and reference will now be had to the wiper rock shafts proper and the manner in which the cables oscillate them. Referring particularly to Fig. 2, a vehicle cowl is designated 55 and a windshield rising from the rear edge thereof is designated 56. The fire wall or dash previously described is shown at 11. Supported on the cowl adjacent the base of the windshield is a pair of housings 57 each mounted over an opening 55' in the cowl and having a depending anchor part 57' which is engaged by a clamping bracket 58 for securing the housing in position.

A wiper actuating or rock shaft 59 is journaled in the housing 57 substantially normal to the windshield surface and a wiper arm 60 is secured to rock shaft 59, likewise by any suitable conventional means. A wheel or pulley 61 is fixed to each rock shaft 59 within the housing chamber 57'' which opens downwardly through the cowl opening 55' into the underlying compartment or space.

Figure 7:
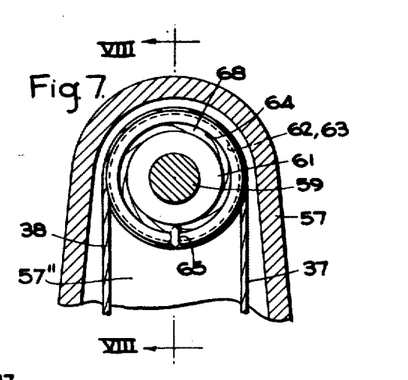
Fig. 7 is a detailed fragmentary cross sectional view taken on the line VII—VII of Fig. 2.
Figure 8:
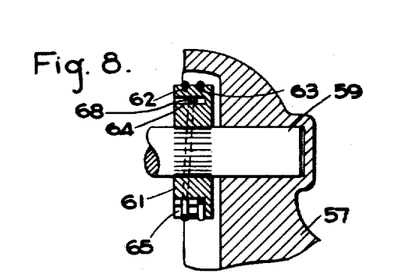
Fig. 8 is a detailed fragmentary cross sectional view taken on the line VIII—VIII of Fig. 7.

The pulley 61 shown in Figs. 7 and 8 has a pair of peripheral cable receiving grooves 62 and 63 and an annular groove 64 in one radial face thereof. The pulley 61 also has a slot 65 wide enough to accommodate the drive cable and extending from one radial face to the bottom of the annular groove 64. In a preferred form the cables for each rock shaft are unitary and continuous and that form will be described herein. The cable for the rock shaft being described here has previously been described as having opposite ends 37 and 38. The approximate mid-point 66 of such cable extends about the pulley within the annular groove 64 and both ends extend through slot 65 and continue about the outer periphery of the pulley in the same direction, one cable end 37 in the groove 62 and the other cable end 38 in the companion groove 63. The foregoing construction permits the wiper rock shafts to oscillate through substantially any desired angle and 180° oscillation, hitherto not practically attainable, is readily accomplished where desired.

In the form illustrated cables 37 and 38 extend downwardly through housing 57 and their downward course is changed to a substantially horizontal one by means of grooved pulleys 70, and the cables thence extend forwardly to a point adjacent the dash where intermediate pulleys 71 mounted for rotation on a vertical axis divert the cables laterally along the dash to their previously described connection with the motor rock shaft crank 30.

Figure 5:
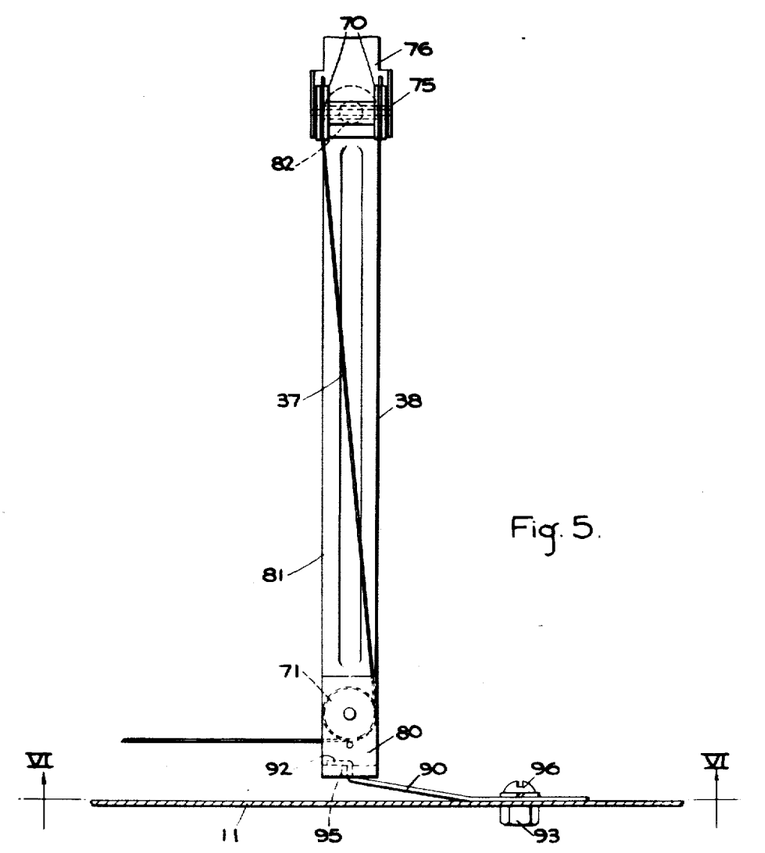
Fig. 5 is a top plan view showing an intermediate lateral portion of the drive means.
Figure 6:
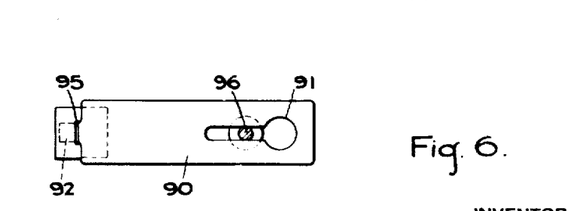
Fig. 6 is an elevational cross sectional view taken on the line VI—VI of Fig. 5.

The guide wheels or pulleys 70 are journaled for free rotation in a U-shaped bracket 75, Figs. 2 and 5, which has an ear 76 extending therefrom for rigid securement to a downward extension 77 of the wiper shaft housing 57, as by means of a screw 78. Pulleys 71 are journaled in a U-shaped terminal portion 80 of a longitudinally extending bracket 81. The latter has pivotal connection with the U-shaped bracket 75 at its rear end as at 82, and serves as a sustaining spacer between the two cable guides 70 and 71. This enables adjustable lateral movement about the pivot 82 to facilitate proper tensioning of the drive cable means. This adjustment is best shown in Figs. 5 and 6 and comprises a member 90 supporting the guide wheels 71 from the fire wall 11. The bracket has a keyhole shaped opening 91 adjacent one end thereof and an offset ear 92 adjacent its other end. The ear 92 is assembled in an opening 95 formed in the bight of the U-shaped portion 80 and the slot 91 is disposed with its enlarged portion over a screw 96 threaded into a clench nut 93. The bracket 90 may then be moved to the right as viewed in Fig. 5 until proper manual tensioning of the cables is attained, whereupon screw 96 is tightened to retain the adjustment.

An effective and facile method of securing a properly balanced tension in the system resides in loosening the screws 21 and 22 which secure the wiper motor 14 to brackets 16 and 17. The pulley supporting bracket 81 at one side of the system is then moved outwardly until the screws 21 and 22 have almost reached their limit of movement in slots 19 and 20 of brackets 16 and 17. The instant bracket 81 is then secured by tightening screw 96 and equalized tension of the cables at opposite sides of the wiper motor is assured by moving the other bracket 81 outwardly the motor being free to move laterally should the cables pull during this slack absorbing adjustment. When the combined cable system is thus equally and suitably tensioned, the second bracket 81 is fixed in position by tightening its screw 96 and the drive or motor 14 is secured by tightening the screws 21 and 22. The manual adjustment avoids the possibility of destructive overtensioning which would be present if screw or other high-mechanical-advantage means were resorted to for such adjustment.

Figure 9:
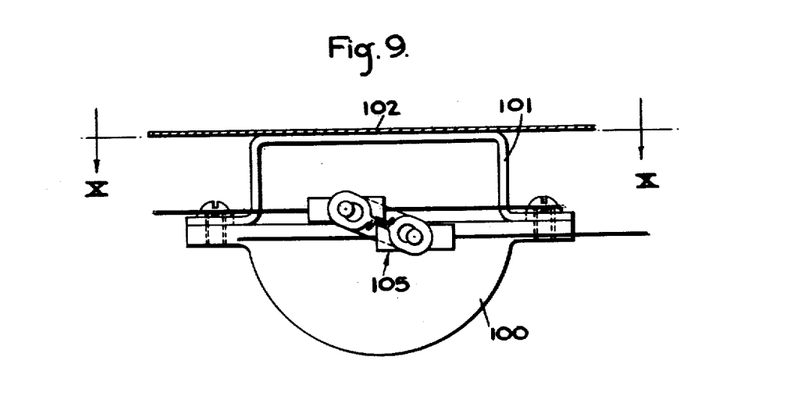
Fig. 9 is a view similar to Fig. 3 of a modified form of the invention.
Figure 10:
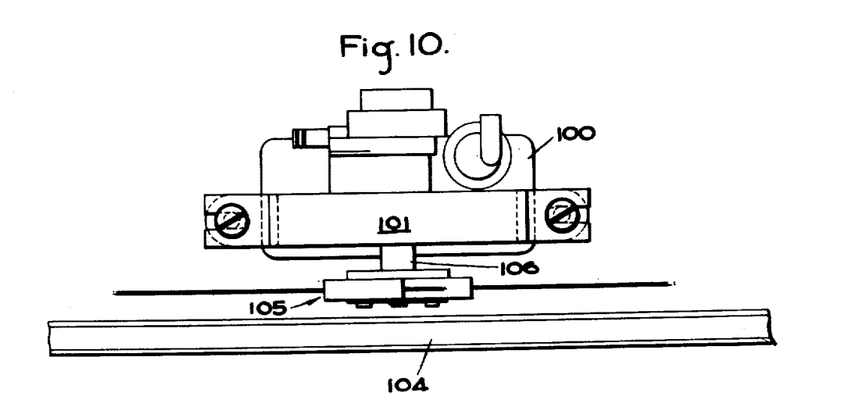
Fig. 10 is a top plan view of the arrangement of Fig. 9 viewed as indicated by the line X—X.

The system of Figs. 9 and 10 is similar to that of the previously described embodiment, the sole difference being that a wiper motor 100 is disposed inside the cowl compartment. The motor 100 may be carried by a U-shaped bracket 101 rigidly secured to the underside of a cowl 102. In Figs. 9 and 10 the motor 100 is spaced rearwardly from a dash or fire wall 104 just enough to accommodate a crank and cable connecting assembly, designated generally 105, between the motor 100 and fire wall 104. The motor 100 has a rock shaft 106 and the assembly 105 carried thereby is the same as that previously described and the description will not need to be repeated.

In this modification the advantage of the manner in which the cables are disposed and all of the other advantages inherent in the general arrangement are present as in the previous embodiment excepting that the motor 100 is not isolated from the passenger compartment. However, even with the motor 100 rearwardly of the dash 104, its incidental sound of operation is not amplified by the connection therewith of rigid linkage having material sound propagating qualities and its sound vibrations are not conducted to points closer to the occupants of the vehicle by such linkage.

The motor 14 may be of the type shown in Patent No. 2,344,949 and placed under the control of a valve 107 on the instrument panel 108 or, where the control valve is mounted on the motor, suitable linkage may be provided for connecting such valve to the control on the instrument panel.

The wiper shaft supporting housing 57, together with the guide wheels 70 as well as the guide wheels 71, are removable as a unit through the cowl opening 55' after first removing the clamping bracket 58. Being removable and insertable as a unit, the installation is facilitated since it is only necessary to insert the housing unit and then engage the heads or enlargements 44 in their seats 47 this being followed by a tensioning adjustment of the guides 71. This adjustment is finally secured by tightening the screw 96, or the slidable pulley support 80, 90, may be provided with a one-way clutch engageable with a fixed part on the fire wall 11 to permit tensioning adjustment while preventing unauthorized slackening of the cables. The adjustment of the guides 71 is substantially in the plane of operation of the driving crank 30, and since the drive or motor 14 is permitted to float during this slack takeup operation, and thereafter to be definitely fixed, the oscillating shaft 15 will not be subjected to unnecessary wear resulting from uneven cable stresses or strains. It may be noted that the guides 70 are definitely related to the driven wiper shafts 59 while the guides 71 are definitely related to the driving member 30, both serving to properly direct the cable reach portions 37, 38, 39 and 40 with respect to such driving and driven parts. The reach portions 37 and 38 move in opposition to each other and likewise move the reach portions 39 and 40. The connector blocks 35 join these pairs of opposite reach portions into a single endless power transmitting member which takes about the wheels 61 of both wiper shafts with the driving force being applied simultaneously to both sides or combined reaches of the endless member. While the driving crank is oscillating back and forth, the opposite combined reaches of this endless flexible transmission member are alternately spaced apart, midway of each stroke, and brought closer together, toward the ends of the stroke, with the result that the driving tension is increased for greater efficiency as the wiper moves across the intermediate field of vision.

The disposition of the motor at the forward side of the fire wall renders the motor easily accessible and enables practically the elimination of all operational noises. The flexible power transmission is arranged adjacent the ceiling of the cowl compartment with the bracket arm 81 serving in the capacity of a housing for enclosing the cable reach portions against the cowl.

While specific examples of the teachings of the present invention are set forth to illustrate its principles, the spirit of the present invention is not restricted to the specific disclosure nor otherwise than as defined in the appended claims.

What is claimed is:

1. A windshield cleaner having a cowl mounted and shaft supporting housing and supporting a wiper actuating shaft in front of and substantially normal to the windshield, a drive means having a drive shaft with means for imparting rotary oscillating movement to the drive shaft, power transmitting cable means for the wiper actuating shaft secured thereto and having opposite reach portions connecting with the drive shaft at angularly spaced points thereon whereby to exert a pulling force alternately upon the two reach portions for oscillating the wiper actuating shaft, spaced cable guiding means interposed between the drive shaft and the wiper actuating shaft for guiding the cable means with respect thereto, and a sustaining spacer supporting the two guiding means adjacent the drive shaft and the wiper actuating shaft respectively.

2. In a motor vehicle having a windshield, a forwardly extending cowl, and a fire wall depending from the forward portion of the cowl, spaced shaft supporting and cowl mounted housings each supporting a wiper actuating shaft in front of and substantially normal to the adjacent portion of the windshield, a drive means having a drive shaft adapted for rotary oscillating movement, power transmitting cable means for each wiper actuating shaft secured thereto and having opposite reach portions extending to and connecting with the drive shaft at angularly spaced points thereon whereby to exert a pulling force alternately upon the reach portions for oscillating the respective wiper actuating shafts, guide means for the cable means including spaced pulleys and a sustaining spacer therebetween carried by the respective shaft supporting housings, each sustaining spacer extending forwardly toward the fire wall, and means adjustably relating the forward ends of the two sustaining spacers to each other, and to the drive shaft for tensioning the cable means.

3. In a motor vehicle having a windshield with a forwardly extending cowl leading to a fire wall serving to partition the engine compartment from the passenger compartment, a wiper actuating shaft journaled at the lower side of the windshield, a drive shaft supporting a driving part for movement in a plane substantially paralleling the fire wall, power transmitting cable means fixed to the wiper actuating shaft and having opposite reach portions connecting with said driving part for alternately pulling the same to rock the wiper shaft, cable guiding means interposed between the wiper shaft and the driving part for directing the cable means into the plane of operation of said part, and means for adjusting the guide means substantially in the plane of operation of said drive part for absorbing slack in the cable means.

4. In a motor vehicle having a windshield with a forwardly extending cowl leading to a fire wall, a pair of housings each providing journal support for a wiper actuating shaft above the cowl, power transmitting cable means fixed to each shaft and providing opposite reach portions extending downwardly within the housing and through the cowl, a drive member mounted for movement about an axis longitudinal of the vehicle and having angularly spaced parts to which the reach portions of both cable means are connected, a pair of guide pulleys mounted on the fire wall one at each side of the drive member for guiding the reach portions substantially into the plane of operation of the spaced parts, and means slidably adjustable on the fire wall at opposite sides of the drive member providing for relative adjustment between the two guide pulleys toward and from the drive member and substantially within the plane of operation of the latter thereby to maintain the adjacent parts of the reach portions substantially in the same angular relation to the drive member.

5. A wiper shaft supporting unit comprising a housing arranged for mounting upon the cowl of a motor vehicle and providing journal support for a wiper shaft above the cowl, said housing having a depending anchor part by which it may be secured in position on the vehicle, power transmitting cable means fixed to the shaft within the housing and providing opposite reach portions, cable guiding means carried by the anchor part of the housing, other guide means for the reach portions arranged in spaced relation to and beyond the first guide means, and a sustaining spacer supporting the other guide means and carried by the housing for forming therewith a replaceable unit for insertion and removal through an opening in the cowl.

6. A wiper shaft supporting unit comprising a housing arranged for mounting upon the cowl of a motor vehicle and providing journal support for a wiper shaft above the cowl, said housing having a depending anchor part for extending through an opening in the cowl and by which it may be secured in position upon the cowl, power transmitting cable means fixed to the shaft within the housing and providing opposite reach portions, cable guiding means carried by the depending anchor part of the housing, other guide means for the reach portions supported in spaced relation to and beyond the first guide means by a sustaining spacer portion of the anchor part and forming with the housing a replaceable unit insertable and removable through the cowl opening, said sustaining spacer portion being angularly adjustable about an axis adjacent the first guide means for enabling cable tensioning adjustment of the second guide means.

7. A wiper shaft supporting unit comprising a shaft, a wheel fixed to the shaft, and a power transmitting cable taking about the wheel, said wheel having an annular groove in one side face with an entrance slot leading therefrom through the periphery of the wheel, with the cable passing about the groove and through the slot for anchoring connection.

8. Windshield cleaner mechanism comprising spaced wiper actuating shafts, a driving crank having spaced crank pins, power transmitting cable means fixed to each shaft and providing opposite reach portions extending toward the driving crank, connector blocks journaled on each crank pin and having oppositely extending seats detachably receiving the terminals of the several reach portions whereby to unite them into an endless power transmitting flexible member operatively connecting both wiper shafts to the driving crank with the latter having driving connection with each side of the endless member, the seats having terminal retaining parts rendered operative by and upon the tensioning of the cable means, and means for so tensioning the cable means.

9. A windshield cleaner comprising a wiper actuating shaft, a driving shaft having a crank pin, a connector block journaled on the crank pin and having a cable receiving groove leading to a seat, and a flexible transmission operatively connecting the two shafts and including a cable having an enlarged head interlocking in the seat of the connector block.

10. A vehicular windshield cleaner mechanism comprising a drive shaft having a crank part, a pair of wiper units each comprising an oscillatable rock shaft, cable drive means for each rock shaft including a pair of cable reaches of definite length connected thereto whereby a pull on one cable reach will rock its shaft in one direction and a pull on the companion cable reach will rock its shaft in the opposite direction, the two cable drive means having their cable reaches approaching the drive shaft from opposite directions, means detachably joining the oppositely positioned cable reaches together to form in effect an endless flexible power transmitting member, said joining means having a part operatively connected to said crank part by which the drive shaft will pull the endless member first in one direction and then in the other direction, and means mounting the drive shaft for bodily adjustment laterally of its axis of rotation whereby said drive shaft when free may center itself with respect to the joining means of the endless member during installation of the cleaner mechanism.

11. A windshield cleaner comprising a wiper actuating shaft journaled adjacent such windshield and having a power transmitting cable fixed to the shaft with opposite reach portions extending therefrom, a drive for the cable movable about an axis and having seats at opposite sides of the axis, said cable reach portions having terminal parts engaging in the seats and detachable therefrom when the reach portions are slackened, and directional supporting means for the reach portions located between the drive and the wiper actuating shaft serving to support such reach portions in tension against cable detachment from the seats.

12. A windshield cleaner comprising spaced wiper actuating shafts journaled adjacent such windshield and each shaft having a power transmitting cable with substantially parallel reach portions extending therefrom, a rotary drive shaft having in effect crank parts at opposite sides of the shaft axis, each crank part having a seat with which the free ends of the reach portions are detachably engageable when the reach portions are slackened, the reach portions from one wiper shaft extending in the opposite direction from the drive shaft relative to the reach portions of the companion wiper shaft and thereby forming with the crank parts and with said companion reach portions an endless flexible power transmitting member between the two wiper actuating shafts, and cable guiding means engaged with the reach portions of each wiper shaft between the latter and the drive shaft for supporting the reach portions in tension thereby to maintain the free ends engaged with the seats, said cable supporting means acting to support and guide the free ends for movement substantially in the plane of movement of said seats.

13. A vehicular windshield cleaner mechanism comprising a drive shaft having in effect oppositely extending crank parts, a pair of wiper units each comprising an oscillatable rock shaft, cable drive means for each rock shaft including a pair of cable reaches of definite length connected thereto whereby a pull on one cable reach will rock its shaft in one direction and a pull on the companion cable reach will rock its shaft in the opposite direction, the two cable drive means having cable reaches approaching the drive shaft from opposite directions, and means detachably joining the oppositely positioned cable reaches together to form in effect an endless flexible power transmitting member having opposed flights each including a joining means, said joining means each having a part operatively connected to a respective one of said crank parts by which the drive shaft will pull the endless member first in one direction and then in the other direction.

14. In a motor vehicle having a windshield with related portions rising from a forwardly extending cowl, a pair of wiper shafts one for each windshield portion journaled substantially normal to the latter, a support arranged beneath the cowl, a drive shaft journaled on the support forwardly of the wiper shafts and having a rotatable part movable about an axis extending lengthwise of the vehicle, an endless flexible transmission taking about each wiper shaft and from thence downwardly and forwardly beneath the cowl to the drive shaft, means operatively connecting the flexible transmission to the rotatable part for being reciprocated thereby, and guide means on the support at opposite sides of the drive shaft supporting the flexible transmission substantially in the plane of movement of the rotatable part.

15. In a motor vehicle having a windshield with related portions rising from a forwardly extending cowl, a pair of wiper shafts one for each windshield portion journaled substantially normal to the latter, a support arranged beneath the cowl, a drive shaft journaled on the support forwardly of the wiper shafts and having a rotatable part movable about an axis extending lengthwise of the vehicle, flexible cable means operatively connecting the wiper shafts together and to the rotatable part for being reciprocated by the latter in synchronism, guide means on the support acting to support the cable means at opposite sides of the rotatable part, and other guide means arranged beneath each wiper shaft and acting in cooperation with the respective first guide means for supporting the adjacent cable portions forwardly extending in substantial parallelism with such axis.

16. In a motor vehicle having a windshield with a forwardly extending cowl, a support beneath the cowl, a drive shaft journaled on the support and having a driving rotatable part moving about an axis extending lengthwise of the vehicle, and a wiper unit mountable as such and comprising a housing supporting a wiper shaft above the cowl and having a depending arm extending forwardly beneath the cowl and providing a guide laterally of the rotatable part, said unit including a flexible pull member operatively connected to the wiper shaft and to the rotatable part and supported by said guide.

17. In a motor vehicle having a windshield with a forwardly extending cowl, a support beneath the cowl, a drive shaft journaled on the support and having a driving rotatable part moving about an axis extending lengthwise of the vehicle, two individual wiper units removably mounted on the cowl and each comprising an upstanding housing journaling a wiper shaft and having a depending guide part beneath the cowl with a cable taking about the wiper shaft and over the guide part, means detachably coupling the opposite ends of the cables of the two units operatively together into an endless power transmission for insuring synchronous movement of the wipers while enabling individual displacement of either unit, and means operatively connecting the transmission to the rotatable part.

18. In a motor vehicle having a windshield with a forwardly extending cowl, a support beneath the cowl, a drive shaft journaled on the support and having a driving rotatable part moving about an axis extending lengthwise of the vehicle, two individual wiper units removably mounted on the cowl and each comprising an upstanding housing journaling a wiper shaft and having a depending guide part beneath the cowl with a cable taking about the wiper shaft and over the guide part, means detachably coupling the opposite ends of the cables of the two units operatively together into an endless power transmission for insuring synchronous movement of the wipers while enabling individual displacement of either unit, means operatively connecting the transmission to the rotatable part, and guide means for the cables arranged on the opposite sides of the drive shaft and acting to dispose the adjacent cable portions in a plane that is substantially normal to the axis of movement of the rotatable part and to direct the remote cable portions which lead to the guide parts in a direction substantially parallel to such axis.

19. Vehicular windshield cleaner mechanism comprising power means and a pair of wiper units, said power means having a drive shaft and a pair of oppositely directed rotatable parts fixed thereto, each wiper unit comprising an oscillatable wiper actuating shaft and a flexible transmission having a pair of reach portions extending from the opposite sides of the actuating shaft to respective ones of the rotatable parts, the reach portions of the two transmissions extending in opposite directions from the rotatable parts and constituting in effect an endless flexible power transmitting member serving to tie the two actuating shafts together for movement in synchronism, and slack take-up means interposed between the drive shaft and each actuating shaft and acting upon the respective reach portions to lead the adjacent parts thereof to the rotatable parts substantially in the plane of movement of the latter and to lead the remote parts thereof to the actuating shafts in a direction substantially parallel to the axis of rotation of the drive shaft.

20. A windshield cleaner unit comprising an upstanding housing mountable upon the cowl of a motor vehicle and journaling a wiper shaft, said housing when in position on a cowl having a part depending through an opening therein, a guide carried on the depending part beneath the cowl and extending transversely of the axis of rotation of the wiper shaft, and a cable means connected to the wiper shaft with opposite reach portions extending downwardly about the transverse guide and therefrom in a direction beneath the cowl and terminating in anchoring enlargements for detachable engagement with a drive, said transverse guide acting to hold the reach portions spaced apart, and said housing and wiper shaft with the transverse guide and cable being mountable and demountable as a unit.

JOHN R. OISHEI.

(References on following page)

REFERENCES CITED

The following references are of record in the file of this patent:

UNITED STATES PATENTS

| Number | Name | Date |
|---|---|---|
| 1,022,134 | Heckert | Apr. 2, 1912 |
| 1,491,834 | Van Loozen | Apr. 29, 1924 |
| 2,082,485 | Evans | June 1, 1937 |
| 2,146,215 | Horton | Feb. 7, 1939 |
| 2,252,350 | Paulus | Aug. 12, 1941 |
| 2,326,349 | Fuller et al. | Aug. 10, 1943 |

FOREIGN PATENTS

| Number | Country | Date |
|---|---|---|
| 408,318 | Great Britain | Apr. 9, 1934 |
| 841,385 | France | Feb. 6, 1939 |

Certificate of Correction

Patent No. 2,572,750　　　　　　　　　　　　　　　　　　　　　October 23, 1951

JOHN R. OISHEI

It is hereby certified that error appears in the printed specification of the above numbered patent requiring correction as follows:

Column 8, line 59, after "means", second occurrence, insert *adjustable in the direction of extent of the fire wall*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*